United States Patent
Koyanagi

(10) Patent No.: US 11,558,522 B2
(45) Date of Patent: Jan. 17, 2023

(54) MEDIUM TRANSPORTATION DEVICE AND IMAGE READER

(71) Applicant: SEIKO EPSON CORPORATION, Tokyo (JP)

(72) Inventor: Noriyuki Koyanagi, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/450,083

(22) Filed: Oct. 6, 2021

(65) Prior Publication Data

US 2022/0116506 A1 Apr. 14, 2022

(30) Foreign Application Priority Data

Oct. 9, 2020 (JP) .............................. JP2020-171036

(51) Int. Cl.
*H04N 1/00* (2006.01)

(52) U.S. Cl.
CPC ....... *H04N 1/00779* (2013.01); *H04N 1/0066* (2013.01); *H04N 1/00408* (2013.01); *H04N 1/00689* (2013.01); *H04N 1/00716* (2013.01); *H04N 1/00718* (2013.01); *H04N 1/00726* (2013.01); *H04N 1/00798* (2013.01)

(58) Field of Classification Search
None
See application file for complete search history.

(56) References Cited

U.S. PATENT DOCUMENTS

| 5,453,852 | A | * | 9/1995 | Morikawa | B65H 3/063 271/124 |
| 11,097,914 | B2 | * | 8/2021 | Sasaki | B41J 15/048 |
| 2010/0194037 | A1 | * | 8/2010 | Sekigawa | B65H 31/36 271/220 |
| 2011/0049792 | A1 | * | 3/2011 | Suzuki | B65H 5/38 271/226 |
| 2019/0092594 | A1 | * | 3/2019 | Mori | B65H 5/36 |
| 2020/0071107 | A1 | | 3/2020 | Yoshita | |
| 2021/0300076 | A1 | * | 9/2021 | Miyase | B41J 11/04 |

FOREIGN PATENT DOCUMENTS

JP 2020-037478 A 3/2020

* cited by examiner

*Primary Examiner* — Gabriel I Garcia
(74) *Attorney, Agent, or Firm* — Workman Nydegger

(57) ABSTRACT

A medium transportation device includes a supply roller configured to send a medium downstream, at least one stopper configured to be switched between a blocking state in which the at least one stopper blocks the transportation path and an open state in which the at least one stopper opens the transportation path, and a controller configured to perform skew correction control in which a leading edge of the medium is brought in contact with the at least one stopper in the blocking state to correct skew of the medium. The controller is configured to obtain information about a stiffness of the medium and, when a second medium having a lower stiffness than a first medium is transported, the controller switches the at least one stopper from the blocking state to the open state to end the skew correction control earlier than the skew correction control of the first medium.

15 Claims, 10 Drawing Sheets

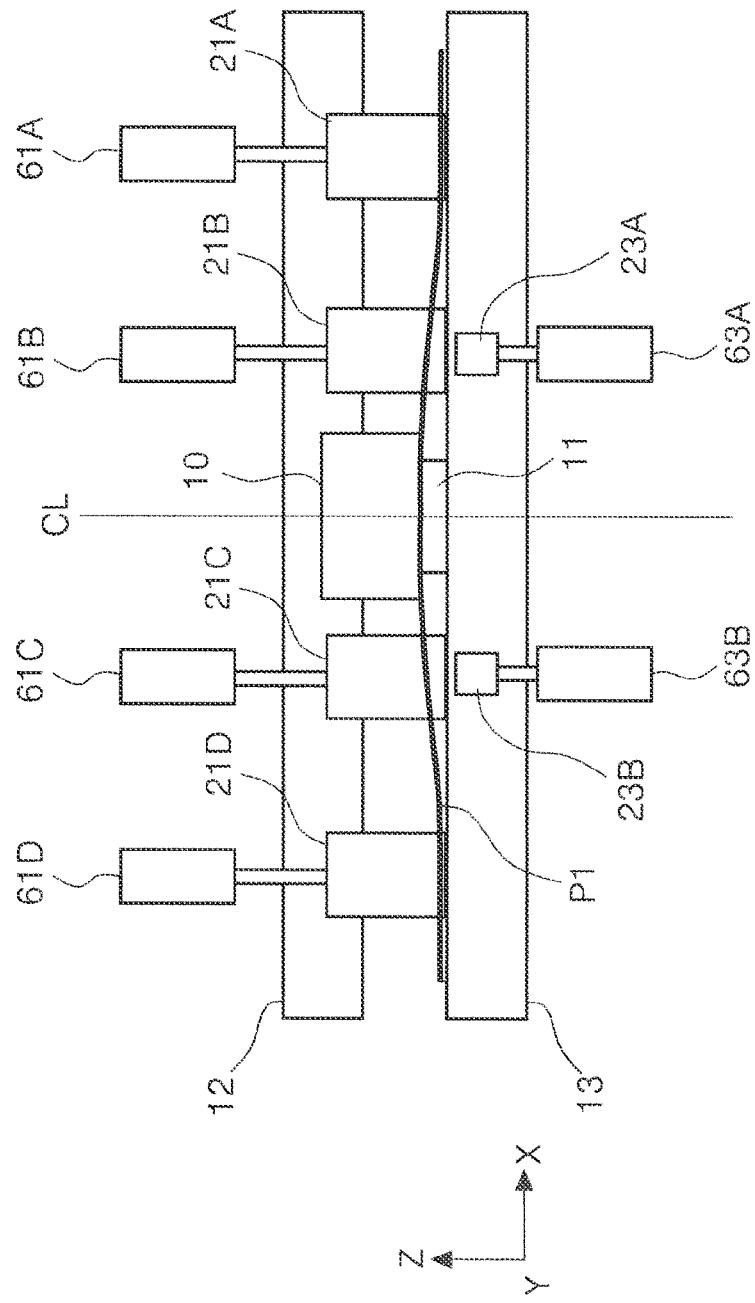

MEDIUM TRANSPORTATION DEVICE AND IMAGE READER

The present application is based on, and claims priority from JP Application Serial Number 2020-171036, filed Oct. 9, 2020, the disclosure of which is hereby incorporated by reference herein in its entirety.

BACKGROUND

1. Technical Field

The present disclosure relates to a medium transportation device that transports a medium and an image reader including the medium transportation device.

2. Related Art

An example of an image reader is a sheet feed image reader that reads an image of a medium being transported. In some cases, such an image reader includes a structure that corrects skew of a medium, for example, as indicated in JP-A-2020-037478. The image reader described in JP-A-2020-037478 includes a medium transportation device including a skew correction structure. The skew correction structure includes a left stopper, a right stopper, a left lever, and a right lever. These components are provided to switch between a blocking state in which the document transportation path is blocked and an open state in which the document transportation path is open. The left and right levers are located slightly upstream of the left and right stoppers. The left lever locks the left stopper in the blocking state. When the left lever is pushed up by a leading edge of a medium, the lock of the left stopper by the left lever is cancelled, allowing the left stopper to open the document transportation path. In the same way, the right lever locks the right stopper in the blocking state. When the right lever is pushed up by a leading edge of a medium, the lock of the right stopper by the right lever is cancelled, allowing the right stopper to open the document transportation path.

In the skew correction structure having the above-described configuration described in JP-A-2020-037478, if the medium is skewed, the leading edge of the medium will come in contact with the left or right stopper at the most advanced side. This allows the medium to turn and thus the skew is corrected. During the skew correction, the leading edge of the medium pushes the left and right levers up. This cancels the lock of the left and right stoppers, enabling the leading edge of the medium to move further downstream.

In the skew correction structure described in JP-A-2020-037478, when a medium having a high degree of stiffness is skewed, the leading edge of the medium comes in contact with the left or right stopper as described above. Thus, the medium is turned, and the skew is corrected. However, when a medium having a low stiffness is skewed, although the leading edge of the medium comes in contact with the left or right stopper, the portion of the medium in contact with the stopper would be crushed before the medium is turned and the medium would be damaged.

SUMMARY

To solve the above-described problem, a medium transportation device according to an aspect of the present disclosure includes a supply roller configured to send a medium downstream, at least one stopper that is located downstream of the supply roller in a medium transportation direction in a transportation path along which the medium is transported, the at least one stopper being configured to be switched between a blocking state in which the at least one stopper blocks the transportation path and an open state in which the at least one stopper opens the transportation path, and a controller that is configured to control rotation of the supply roller and control the switching of the state of the at least stopper. The controller is configured to perform skew correction control in which a leading edge of the medium is brought in contact with the at least one stopper in the blocking state to correct skew of the medium. The controller is configured to obtain information about a stiffness of the medium and, when a second medium having a lower stiffness than a first medium is transported, the controller switches the at least one stopper from the blocking state to the open state to end the skew correction control earlier than the skew correction control of the first medium. Furthermore, an image reader according to another aspect of the present disclosure includes the above-described medium transportation device, and a reading device configured to read a surface of the medium transported by the medium transportation device.

BRIEF DESCRIPTION OF THE DRAWINGS

FIG. 10 is a front view indicating the stiffness adding portion away from the transportation path.

DESCRIPTION OF EXEMPLARY EMBODIMENTS

Figure 1:
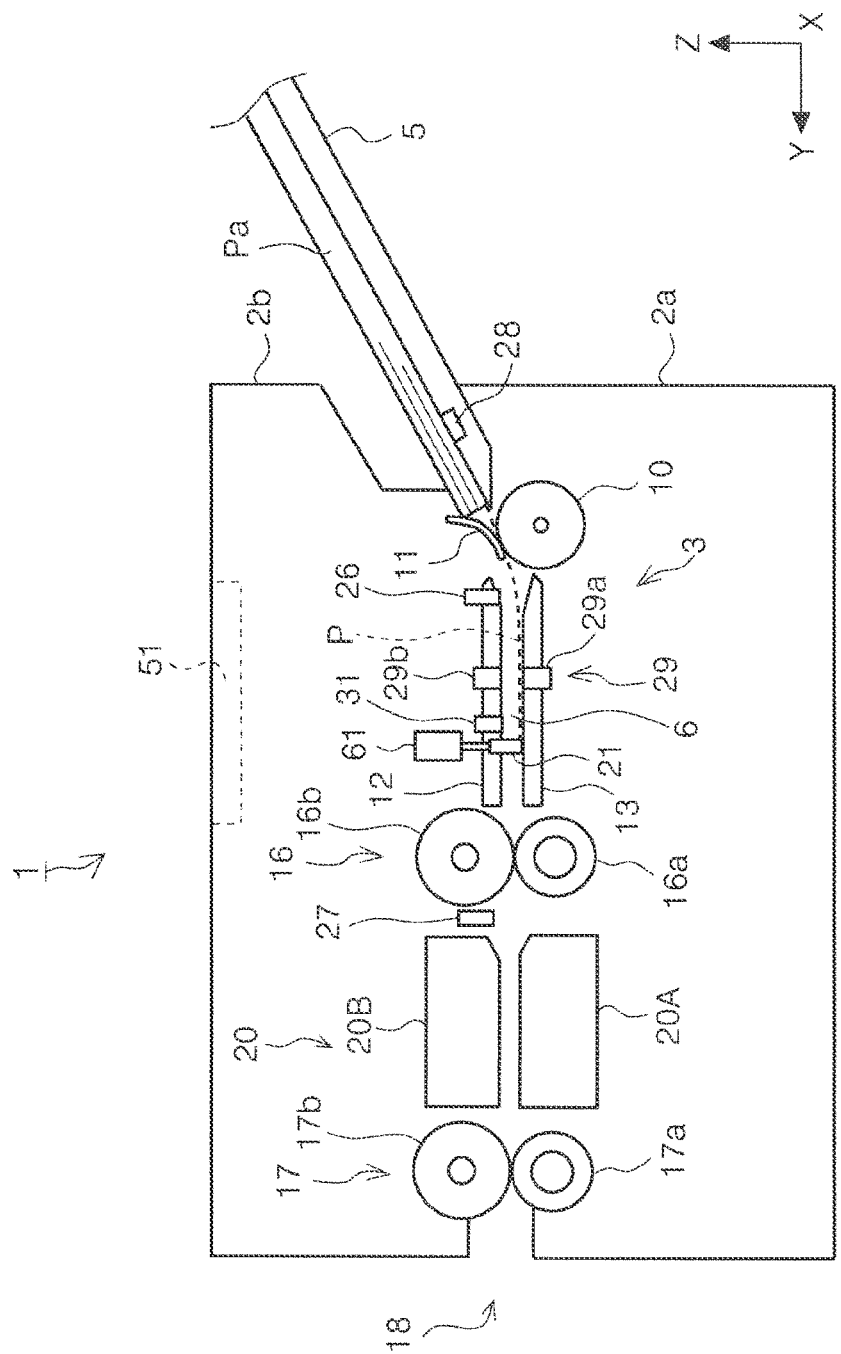
FIG. 1 is a side view illustrating a document feed route of a scanner with a stopper being in a blocking state.

Hereinafter, an outline of the present disclosure will be described. A medium transportation device according to an aspect of the present disclosure includes a supply roller configured to send a medium downstream, at least one stopper that is located downstream of the supply roller in a medium transportation direction in a transportation path along which the medium is transported the at least one stopper being configured to be switched between a blocking state in which the at least one stopper blocks the transportation path and an open state in which the at least one stopper opens the transportation path, and a controller configured to control rotation of the supply roller and control the switching of the state of the at least stopper. The controller is configured to perform skew correction control in which a leading edge of the medium is brought in contact with the at least one stopper in the blocking state to correct skew of the medium. The controller is configured to obtain information about a stiffness of the medium and, when a second medium having a lower stiffness than a first medium is transported, the controller switches the at least one stopper from the blocking state to the open state to end the skew correction control earlier than the skew correction control of the first medium.

In this configuration, the controller configured to perform the skew correction control is configured to obtain the information about the stiffness of the medium and, when the second document having a lower stiffness than the first document is transported, switch the stopper from the blocking state to the open state to end the skew correction control earlier than when the first document is transported. Thus, when the second medium having a lower stiffness than the first medium is transported, the leading edge of the medium is less likely to be crushed when brought in contact with the stopper.

In the medium transportation device, the controller may determine the stiffness of the medium based on a thickness of the medium. In this configuration, the controller readily determines the stiffness of the medium, because the stiffness of the medium is determined based on the thickness of the medium.

The medium transportation device may further include a thickness sensor that is configured to determine a thickness of the medium and is located downstream of the supply roller and upstream of the at least one stopper in the medium transportation direction in the transportation path. The controller may determine the stiffness of the medium based on information sent from the thickness sensor.

In this configuration, a thickness sensor is located downstream of the supply roller and upstream of the stopper in the medium transportation direction in the transportation path. This eliminates the need for the user to input the information about the thickness of the medium, improving the usability of the device.

The medium transportation device may further include an information input receiver that receives input of information about a type of the medium. The controller may determine the stiffness of the medium based on the information about the type of the medium. Alternatively, the medium transportation device may further include an information input receiver that receives input of information about a medium read mode. The controller may determine the stiffness of the medium based on the information about the medium read mode. In this configuration, the controller determines the stiffness of the medium based on the information about at least one of the type of medium and the medium read mode, which are received by the information input receiver. This enables the controller to have correct information about the stiffness of the medium.

The medium transportation device may further include a medium placement portion on which the medium to be sent by the supply roller is placed, and a presence sensor configured to detect the medium on the medium placement portion. The information input receiver may include a display configured to display various types of information. The controller may be configured to display, on the display, a user interface that accepts input of the information about the type of the medium, and the controller may display the user interface on the display upon determination that, in a transportation standby state, the medium is on the medium placement portion based on information sent from the presence sensor. Furthermore, the controller may display, on the display, a user interface that accepts input of information about the medium read mode.

In this configuration, the controller displays, on the display, the user interface that accepts input of at least one of the information about the type of medium and the information about the medium read mode upon determination that, in the transportation standby state, the medium is on the medium placement portion based on the information sent from the presence sensor. This eliminates the need for the user to perform an operation for displaying the user interface, improving the convenience for the user.

In the medium transportation device, the controller may be configured to perform standby control including waiting for a medium to be placed on the medium placement portion and rotating the supply roller in a positive direction to send the medium from the medium placement portion upon determination that the medium is placed on the medium placement portion based on the information sent from the presence sensor, and the controller may be configured to send the medium from the medium placement portion without displaying the user interface on the display when the controller obtains information about the stiffness of the medium in the standby control.

In this configuration, when the controller obtains the information about the stiffness of the medium in the standby control, the controller sends the medium on the medium placement portion without displaying the user interface on the display. This eliminates the need for the user to input the information about the stiffness of the medium at each time the user places a medium on the medium placement portion, improving the usability of the device.

The medium transportation device may further include a skew sensor located downstream of the supply roller in the medium transportation direction and upstream of the at least one stopper in the medium transportation direction in the transportation path. The skew sensor is configured to detect a skew of a leading edge of the medium. The controller is configured to perform error handling when the skew of the medium after a predetermined time of the skew correction control is determined to be larger than a predetermined threshold based on information from the skew sensor.

In this configuration, the controller performs the error handling when the skew of the medium after a predetermined time of the skew correction control is determined to be larger than a predetermined threshold based on the information from the skew sensor. When the skew correction of the medium is not successful, a positive processing result is obtained by the error handling.

In the medium transportation device, the error handling may include reducing a rotation speed of the supply roller while continuing the skew correction control. In this configuration, the error handling includes reducing the rotation speed of the supply roller to continue the skew correction control. Thus, the leading edge of the medium is less likely to be crushed when brought in contact with the stopper and the skew correction is likely to proceed because the medium is turned.

In the medium transportation device, the error handling may include rotating the supply roller backward to send back the medium upstream in the medium transportation direction and performing the skew correction control again. In this configuration, the skew correction is likely to be successfully performed, because the error handling includes rotating the supply roller backward to send back the medium upstream and performing the skew correction control again.

The medium transportation device may further include a display configured to display various types of information and a medium placement portion on which a medium to be sent by the supply roller is placed. The error handling may include stopping the supply roller and displaying, on the display, an instruction to set the medium again on the medium placement portion.

In this configuration, the error handling includes stopping the supply roller and displaying, on the display, an instruction to set the medium again on the medium placement portion. The medium that is set again on the medium placement portion by the user is likely to be transported with less skew next time.

An image reader according to another aspect of the present disclosure includes the medium transportation device configured to transport a medium and a reading device configured to read a surface of the medium transported by the medium transportation device. In this configuration, the image reader obtains any of the above-described advantages.

Hereinafter, the present disclosure will be described in detail. In the following description, a scanner 1 configured to read at least one of front and back sides of a document, which is an example of a medium, is described as an example of the image reader. The scanner 1 is in the form of a sheet feed scanner that reads a document while transporting it to a reading device.

In the X-Y-Z coordinate system in the drawings, the X axis direction corresponds to a device width direction or a document width direction. The Y axis direction corresponds to a device depth direction and the horizontal direction. The Z axis direction corresponds to the vertical direction. In the following description, in some cases, a direction in which the document is transported (+Y direction) is referred to as downstream, and a direction opposite this direction (−Y direction) is referred to as upstream.

The scanner 1 in FIG. 1 includes a lower unit 2a and an upper unit 2b above the lower unit 2a. The upper unit 2b is rotatable about a shaft (not illustrated) located at an end in the +Y direction of the lower unit 2a. The lower unit 2a is uncovered when the upper unit 2b is rotated. A transportation path 6, which will be described later, is exposed when the lower unit 2a is uncovered by the upper unit 2b.

The upper unit 2b includes an operation screen 51 that accepts input of various operation instructions on the upper surface. In this embodiment, the operation screen 51 is a touchscreen that has both displaying and input functions. The operation screen 51 functions as an information input receiver that receives input of a variety of information and a display that displays a variety of information.

Figure 2:
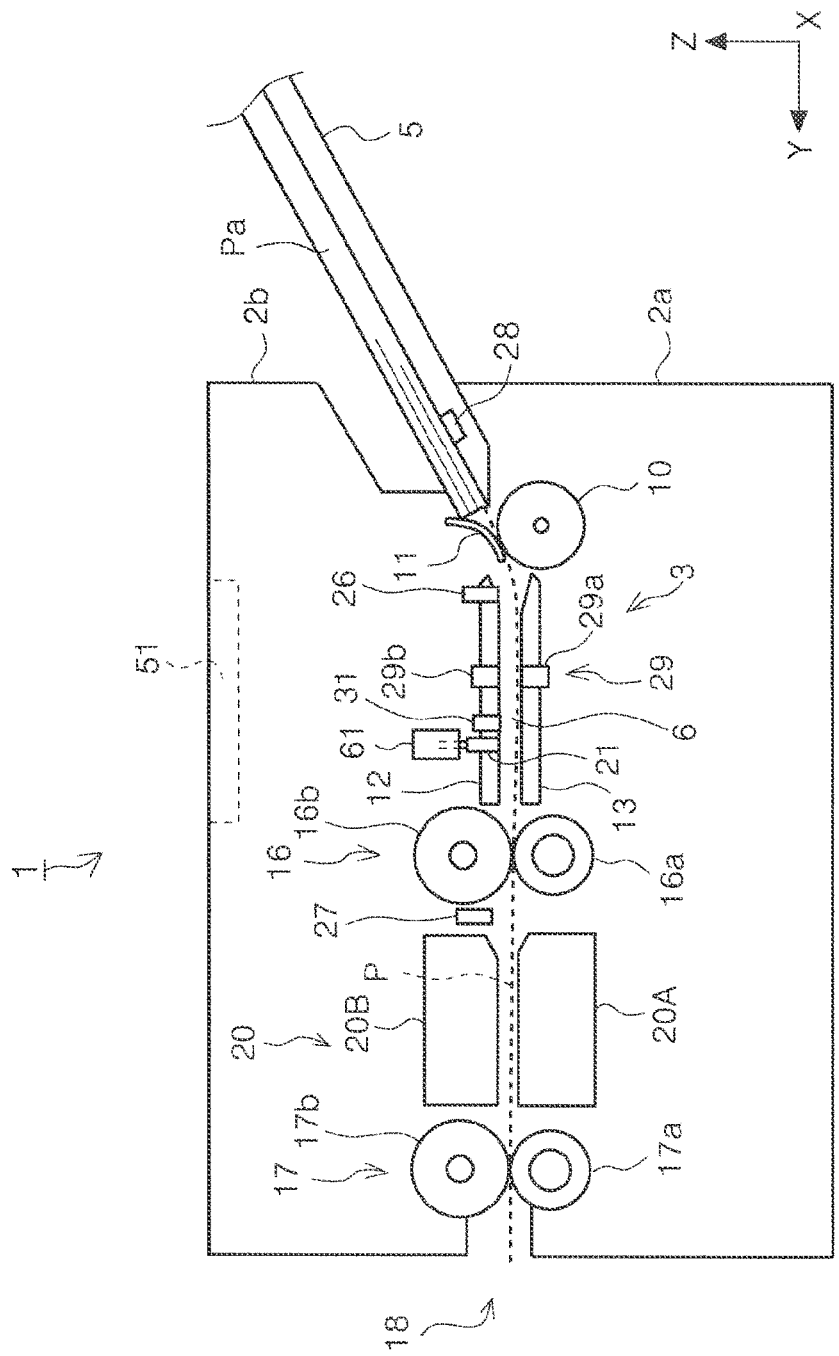
FIG. 2 is a side view illustrating the document feed route of the scanner with the stopper being in an open state.

In the following, the document feed route in the scanner 1 is described. A document tray 5, which is an example of the medium placement portion, is disposed on the most upstream of the document feed route. The document indicated by a reference symbol Pa is obliquely positioned and supported by the document tray 5. A feed roller 10 that is driven by a feed motor 52 (FIG. 3) is located downstream of the document tray 5. The feed roller 10 is an example of the supply roller that sends a document downstream. The feed roller 10 sends one on the bottom among the documents on the document tray 5 downstream. In FIGS. 1 and 2, the reference symbol P indicates an example of the document sent from the document tray 5.

The scanner 1 includes a separation pad 11 facing the feed roller 10. The separation pad 11 prevents another document from being sent downstream together with the document on the bottom sent by the feed roller 10, i.e., multi-feed problem. An upper path formation member 12 and a lower path formation member 13, which are located downstream of the feed roller 10 and the separation pad 11, form the transportation path 6 along which a document is sent. In this embodiment, the transportation path 6 extends from the feed roller 10 to a first transportation roller pair 16. The feed roller 10 and the separation pad 11 are located at a central position CL (see FIG. 9) in the X axis direction of the transportation path 6 to prevent the document from being skewed by a feeding force of the feed roller 10.

A first document sensor 26, a stiffness sensor 29, a skew sensor 31, and a stopper 21 are disposed along the transportation path 6. These components will be described later. A first transportation roller pair 16 is disposed downstream of the stopper 21. A read portion 20, which is a reading device that reads a document image, is disposed downstream of the first transportation roller pair 16. A second transportation roller pair 17 is disposed downstream of the read portion 20.

The first transportation roller pair 16 includes a drive roller 16a that is driven by a transportation motor 53 (see FIG. 3) and a driven roller 16b that is rotated by rotation of the drive roller 16a. The driven roller 16b is movable toward and away from the drive roller 16a and is pressed toward the drive roller 16a by a presser (not illustrated).

The document sent downstream by the feed roller 10 is nipped by the first transportation roller pair 16 and transported to a position where the medium faces a lower sensor unit 20A and an upper sensor unit 20B, which are located downstream of the first transportation roller pair 16.

The read portion 20 includes the lower sensor unit 20A located below the document feed route and the upper sensor unit 20B located above the document feed route. The lower and upper sensor units 20A and 20B are contact image sensor modules (CISM). The lower sensor unit 20A located below the document feed route reads a lower side of the document. The upper sensor unit 20B located above the document feed route reads an upper side of the document.

After the read portion 20 reads an image of at least one of the upper and lower sides of the document, the document is nipped by the second transportation roller pair 17 located downstream of the read portion 20 to be ejected through an outlet 18. The second transportation roller pair 17 includes a drive roller 17a that is rotated by the transportation motor 53 (see FIG. 3) and a driven roller 17b that is rotated by rotation of the drive roller 17a. The driven roller 17b is movable toward and away from the drive roller 17a and is pressed toward the drive roller 17a by a presser (not illustrated).

Next, a control system of the scanner 1 is described with reference to FIG. 3 and FIG. 1 as appropriate. A controller 50, which is a control device, controls various functions of the scanner 1, such as feeding, transportation, ejection, and reading of a document. In particular, the controller 50 performs skew correction control, which will be described later. The controller 50 receives a signal from the operation screen 51 and sends a signal for displaying the operation screen 51, particularly a signal for displaying a user interface (hereinafter, referred to as "UI") to the operation screen 51.

The controller 50 controls the feed motor 52 and the transportation motor 53. In this embodiment, the motors are DC motors. The controller 50 receives detection values obtained by rotary encoders (not illustrated), which are individually provided for the feed motor 52 and the transportation motor 53. Thus, the controller 50 has information about the rotation amounts of the motors, in other words, information about the amount of the document transported by the rollers.

The controller 50 controls a left outer solenoid 61A, a left inner solenoid 61B, a right inner solenoid 61C, and a right outer solenoid 61D. The solenoids 61A, 61B, 61C, and 61D are collectively referred to as the solenoid 61 when there is no need to distinguish them. The solenoid 61 is a solenoid actuator including a movable iron core that moves like a piston when switched between a current carrying state and a non-current carrying state. The solenoid 61 has the stopper 21, which will be described later, at the front end of the movable iron core. The solenoid 61 may be a pull solenoid or a push solenoid.

The controller 50 receives data from the read portion 20 and sends a signal for controlling the read portion 20 to the read portion 20. The controller 50 includes a CPU 55, a flash ROM 56, and RAM 57. The CPU 55 performs various arithmetic processing in accordance with programs in the flash ROM 56 to control the overall operation of the scanner 1. The flash ROM 56, which is an example of memory, is a read-write non-volatile memory and stores various control programs and parameters used to control feeding and reading of a document. The flash ROM 56 also stores various programs and parameters required in skew correction control, which will be described later. Furthermore, the flash ROM 56 stores various setting information inputted by the user through the operation screen 51. The RAM 57, which is volatile memory, temporally stores various information. The controller 50 includes an interface 58, enabling communication with an external computer 90 through the interface 58.

The controller 50 receives signals from sensors including a presence sensor 28, the first document sensor 26, the second document sensor 27, the stiffness sensor 29, and the skew sensor 31. As illustrated in FIG. 1, the presence sensor 28 is disposed on the document tray 5. The presence sensor 28 is, for example, an optical sensor and includes a light-emitting portion (not illustrated) that emits detection light and a light-receiving portion (not illustrated) that receives the detection light reflected by a document. The intensity of the detection light received by the presence sensor 28 exceeds a predetermined value when a document is placed on the document tray 5. The controller 50 detects the presence of a document on the document tray 5 by using the detection signal from the presence sensor 28. In this embodiment, the presence sensor 28 is a non-contact sensor, but may be a contact sensor.

The first document sensor 26 is located downstream of the feed roller 10. The first document sensor 26 is, for example, an optical sensor and includes a light-emitting portion (not illustrated) that emits detection light and a light-receiving portion (not illustrated) that receives the detection light reflected by a document. The intensity of light received by the first document sensor 26 exceeds a predetermined value when the document reaches the first document sensor 26. The controller 50 detects passage of a leading or trailing edge of the document by using the detection signal from the first document sensor 26. The first document sensor 26 may be a light-transmitting sensor instead of the reflection sensor and may be a non-contact sensor instead of the non-contact sensor of this embodiment.

The stiffness sensor 29 is located downstream of the first document sensor 26. In this embodiment, as illustrated in FIG. 1, the stiffness sensor 29 is an ultrasonic sensor including an ultrasonic wave transmitter 29*a* and an ultrasonic wave receiver 29*b* facing each other with the transportation path 6 therebetween. The controller 50, which will be described later, determines the stiffness of the document based on the intensity of the signal from the stiffness sensor 29. In other words, the detection signal from the stiffness sensor 29 is information about the stiffness of the document.

For example, in a case in which a second document has a smaller thickness and stiffness than a first document, the intensity of the ultrasonic wave transmitted through the second document to the ultrasonic wave receiver 29*b* is higher than that of the ultrasonic wave transmitted through the first document to the ultrasonic wave receiver 29*b*. This enables the controller 50 to determine the stiffness of the document. When the documents are formed of the same or similar material, the intensity of the ultrasonic wave received by the ultrasonic wave receiver 29*b* changes depending on the thickness of the documents. Thus, the stiffness sensor 29 of this embodiment may be referred to as a thickness sensor that determines the thickness of the document. In this case, the intensity of the ultrasonic wave received by the ultrasonic wave receiver 29*b* is information about the thickness of the document.

In this embodiment, the stiffness sensor 29 is an ultrasonic wave sensor. However, a known paper thickness sensor may be employed to determine the stiffness of the document based on the thickness of paper. In some cases, documents having the same thickness have different stiffness, more specifically different densities. In such cases, an ultrasonic wave sensor used as the stiffness sensor 29 more accurately determines the stiffness of the documents, because ultrasonic waves received at the ultrasonic wave receiver 29*b* have different intensities depending on the densities. Furthermore, in this embodiment, the document sent from the feed roller 10 is pressed against the lower path formation member 13 to curve downward. The document curves more as the stiffness of the document decreases. In light of this, for example, a known ranging sensor may be used as the first document sensor 26 illustrated in FIG. 1 to determine the stiffness of the document. The distance between the first document sensor 26 and the document decreases as the stiffness of the document decreases. If there is no document, the distance determined by the first document sensor 26 is the maximum. In any case, the determination of the stiffness, or the thickness instead of the stiffness, using the sensor eliminates the need for the user to input the information about the stiffness of the document, improving the user friendliness.

Figure 4:
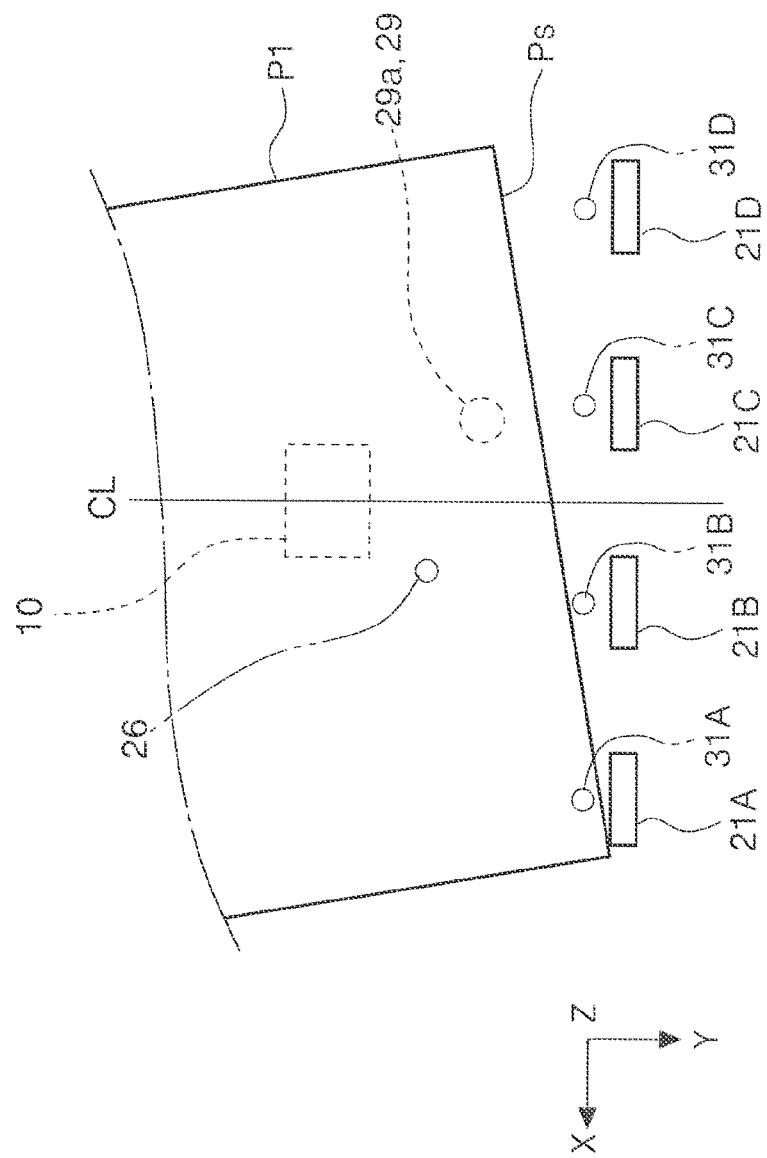
FIG. 4 is a plan view of a transportation path and indicates a relationship between the stopper and a medium.
Figure 5:
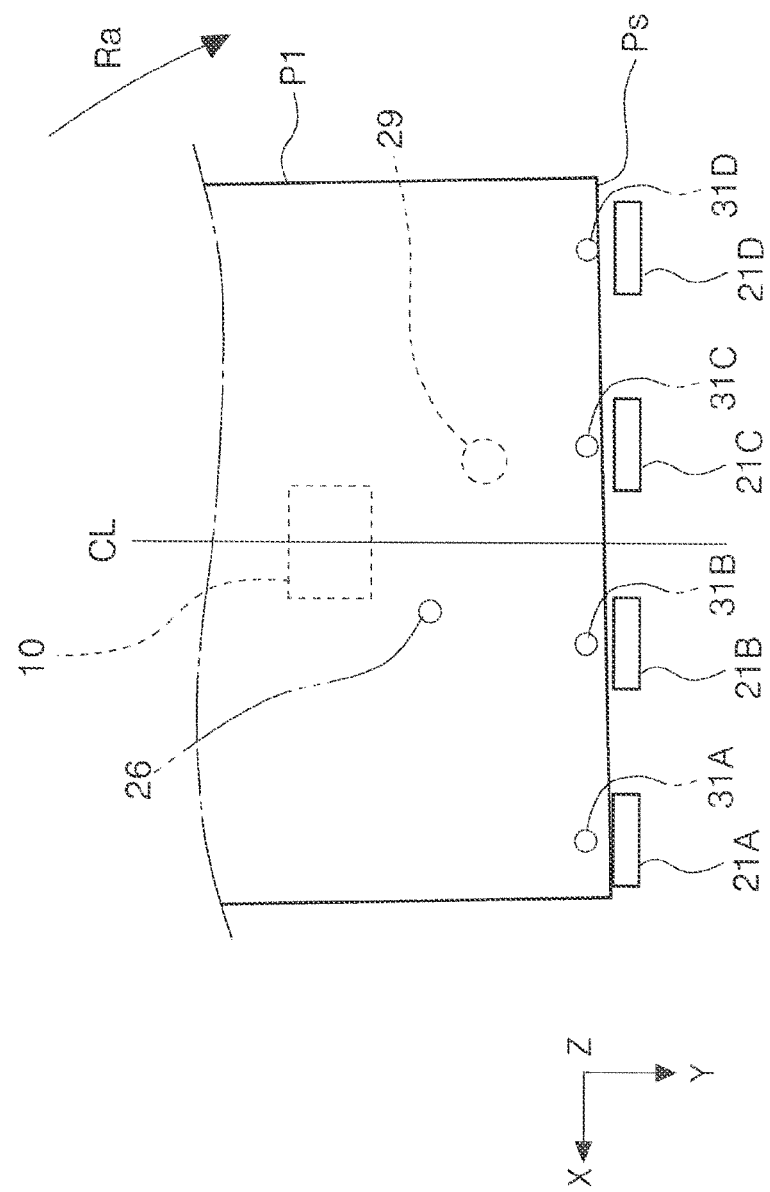
FIG. 5 is a plan view of a transportation path and indicates a relationship between the stopper and a medium.
Figure 6:
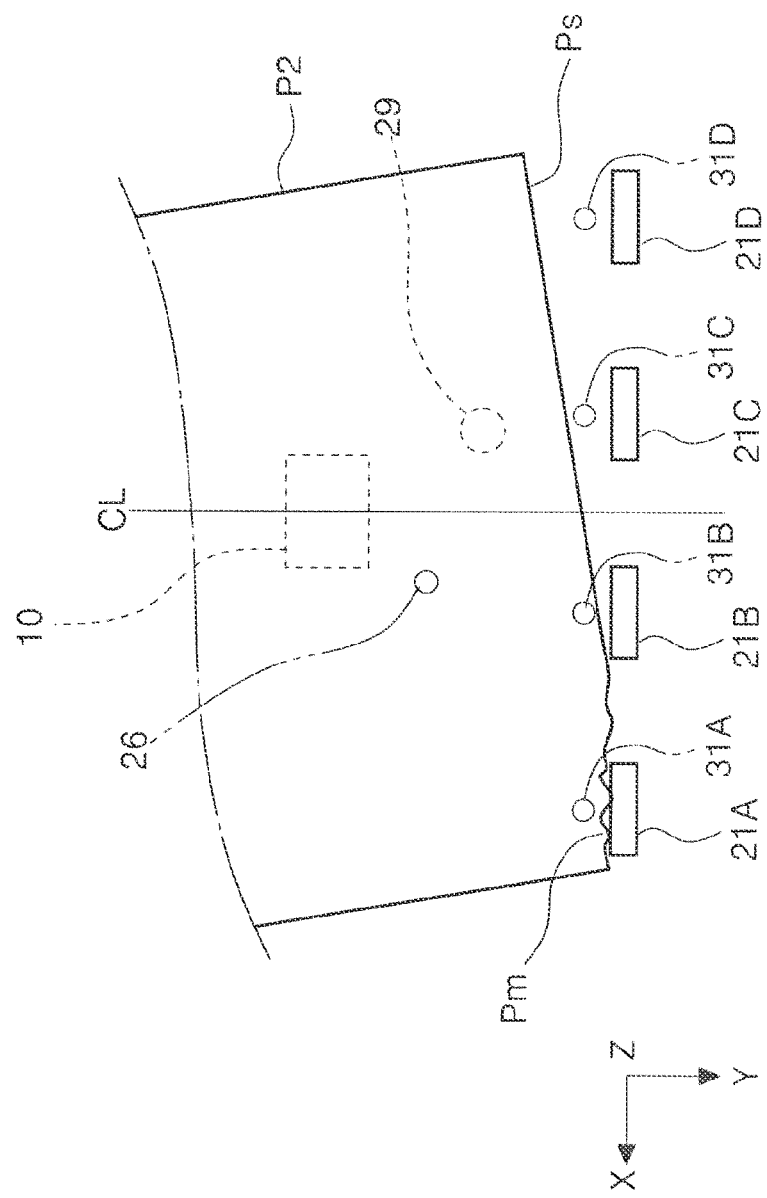
FIG. 6 is a plan view of a transportation path and indicates a relationship between the stopper and a medium.

The skew sensor 31 is located near and upstream of the stopper 21, which will be described later, and is an optical sensor including a light-emitting portion (not illustrated) that emits detection light and a light-receiving portion (not illustrated) that receives the detection light reflected by a document. The intensity of light received by the skew sensor 31 exceeds a predetermined value when the document reaches the skew sensor 31. The skew sensor 31 may be a light-transmitting sensor instead of the reflection sensor. The skew sensor 31 includes multiple sensors as illustrated in FIGS. 4 to 6. Specifically described, the skew sensor 31 includes a left outer sensor 31A, a left inner sensor 31B, a right inner sensor 31C, and a right outer sensor 31D. The straight line CL in FIGS. 4 to 6 indicates the central position of the transportation path 6 in the X axis direction. The sensors are symmetrically arranged with respect to the central position CL at positions corresponding to the stoppers 21, which will be described later. If the leading edge Ps of the document is skewed, only the left outer sensor 31A detects the presence of the document as illustrated in FIG. 4 and the other sensors do not detect the presence of the document, for example. The controller 50 determines whether the document is skewed based on the detection signals from the sensors included in the skew sensor 31.

Next, the second document sensor 27 is an optical sensor located between the first transportation roller pair 16 and the read portion 20 and includes a light-emitting portion (not illustrated) that emits detection light and a light-receiving portion (not illustrated) that receives the detection light reflected by a document. The intensity of light received by the second document sensor 27 exceeds a predetermined value when the document reaches the second document sensor 27. The controller 50 detects the passage of a leading or trailing edge of the document at the position of the second document sensor 27 by using the detection signal from the second document sensor 27. The second document sensor 27 may be a light-transmitting sensor instead of the reflection sensor and may be a non-contact sensor instead of the non-contact sensor of this embodiment.

The feed roller 10 and the controller 50 described above and the stopper 21, which will be described later, constitute a document transportation device 3 (see FIGS. 1 and 2), which is an example of the medium transportation device. The document transportation device 3 may be regarded as a scanner 1 without a document reading function, or a device without the read portion 20, when viewed from a different perspective. In light of the document transportation, the scanner 1 itself may be regarded as the document transportation device although the scanner 1 has a document reading function or the read portion 20. The stiffness sensor 29 and the skew sensor 31 are optional components of the document transportation device 3.

Next, skew correction control using the stopper 21 will be described. As illustrated in FIGS. 1 and 2, the stopper 21 is disposed downstream of the feed roller 10 in the transportation path 6. The stopper 21 is switchable between a blocking state in which the stopper 21 blocks the transportation path 6 as illustrated in FIG. 1 and an open state in which the stopper 21 does not block the transportation path 6 as illustrated in FIG. 2. The state of the stopper 21 is switched by the power of the solenoid 61 controlled by the controller 50.

The stopper 21 includes multiple stoppers as illustrated in FIGS. 4 to 6, and more specifically includes a left outer stopper 21A, a left inner stopper 21B, a right inner stopper 21C, and a right outer stopper 21D. The stoppers are symmetrically arranged with respect to the central position CL. In this embodiment, the stoppers are arranged at a substantially equal interval in the X axis direction. However, the arrangement of the stoppers is not limited to this as long as the stoppers are symmetrically arranged with respect to the central position CL. Furthermore, in this embodiment, two stoppers are disposed on each of left and right sides of the central position CL. However, three or more or only one stopper may be disposed on each of the left and right sides of the central position CL. Alternatively, the stopper 21 may be one component having a shape symmetrical about the central position CL.

Figure 3:
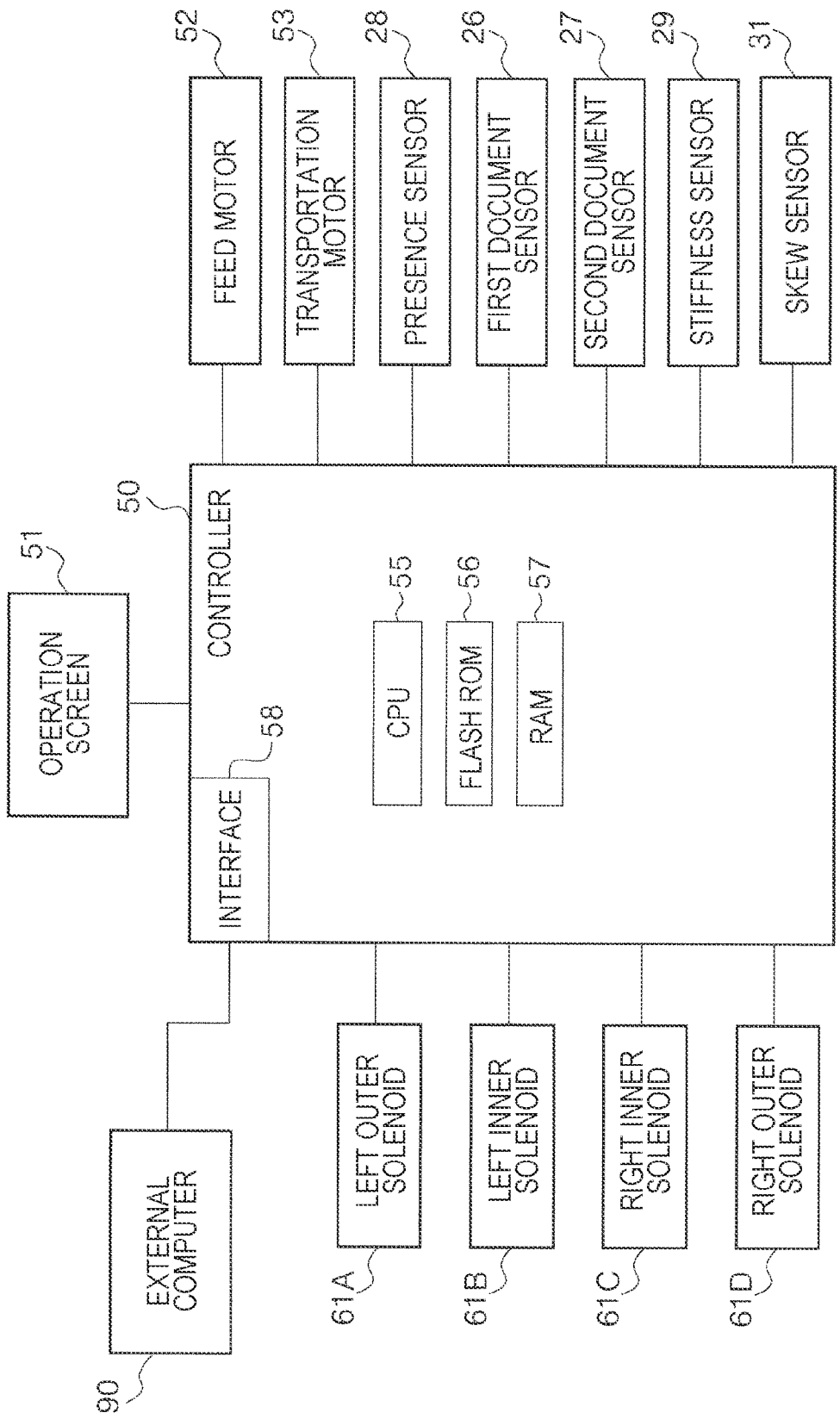
FIG. 3 is a block diagram indicating a control system of the scanner.

In this embodiment, the left outer stopper 21A is driven by the left outer solenoid 61A (see FIG. 3). The left inner stopper 21B is driven by the left inner solenoid 61B (see FIG. 3). The right inner stopper 21C is driven by the right inner solenoid 61C (see FIG. 3). The right outer stopper 21D is driven by the right outer solenoid 61D (see FIG. 3). The stoppers in this embodiment are independently driven. However, all the stoppers may be driven by one solenoid.

The stopper 21 is in a blocking state at the start of document feeding. In FIG. 4, a document P1 being transported is skewed and the leading edge Ps is in contact with the left outer stopper 21A at the most advanced left side. If the skew direction is opposite from that in FIG. 4, the leading edge Ps is in contact with the right outer stopper 21D at the most advanced right side. If the document is small, the leading edge Ps comes in contact with the left inner stopper 21B or the right inner stopper 21C at the most advanced side.

In the example in FIG. 4, the leading edge Ps of the document P1 is in contact with the left outer stopper 21A at the most advanced left side, and thus the document P1, which keeps receiving a feed force from the feed roller 10, turns on the point in contact with the left outer stopper 21A as illustrated in FIGS. 4 and 5 indicating the change. In FIG. 5, the arrow Ra indicates a turn direction of the document P1 at this time. The document P1 turns in this way to correct the skew of the document P1. As described above, in the skew correction control, the leading edge of the document is brought in contact with the stopper 21 in the blocking state and the feed roller 10 is kept rotating to prompt the document to turn. The skew correction control ends when the state of the stopper 21 is switched from the blocking state to the open state.

However, the document may be a document P2 having a lower stiffness than the document P1. In such a case, as illustrated in FIG. 6, when the leading edge Ps comes in contact with the left outer stopper 21A in a blocking state at the most advanced left side, the contact portion may be crushed as indicated by a symbol Pm. The document P2 is not turned in this case and thus the skew is not successfully corrected. In view of this problem, the controller 50 performs different predetermined control depending on the stiffness of the document.

Figure 7:
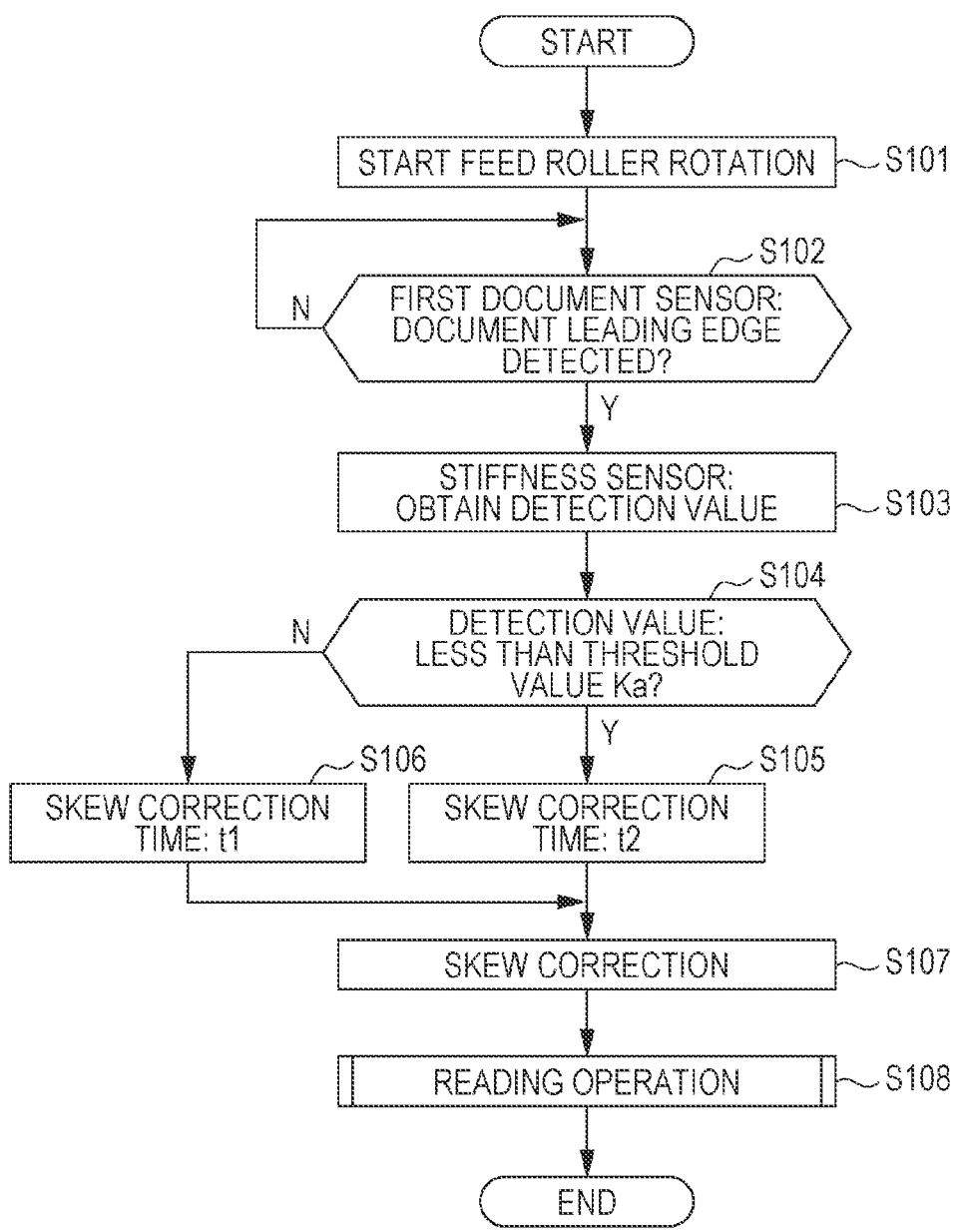
FIG. 7 is a flowchart indicating a skew correction process.

Hereinafter, the skew correction control will be further described with reference to FIG. 7. FIG. 7 illustrates an example of control without the above-described skew sensor 31. The controller 50 starts rotation of the feed roller 10 upon reception of a document read start command (S101). When the first document sensor 26 detects the presence of the leading edge of the document (Yes at S102), the controller 50 obtains a detection value determined by the stiffness sensor 29 (S103) and then determines if the detection value is below a predetermined threshold value Ka (S104).

In other words, the controller 50 determines whether the document being transported is a first document (No at S104) or a second document having a lower stiffness than the first document (Yes at S104). The first document is a document that has a detection value determined by the stiffness sensor 29 equal to or higher than the threshold value Ka. The second document is a document that has a detection value determined by the stiffness sensor 29 below the threshold value Ka. The document P1 described with reference to FIGS. 4 and 5 is an example of the first document. The document P2 described with reference to FIG. 6 is an example of the second document.

When the detection value determined by the stiffness sensor 29 is equal to or higher than the threshold value Ka (No at S104), i.e., the document is the first document, the controller 50 selects a time t1 as a skew correction time. When the detection value determined by the stiffness sensor 29 is below the threshold value Ka (Yes at S104), i.e., the document is the second document, the controller 50 selects a time t2 as a skew correction time. The time t2 is shorter than the time t1. This will be described in more detail later.

Next, the controller 50 performs the skew correction of the document (S107), and then, after the skew correction, the process proceeds to a document read operation (S108). The skew correction time at the step S107 is one of the time t1 and the time t2 selected depending on the detection value determined by the stiffness sensor 29 as described above. For example, the skew correction time is a time elapsing from the detection of the leading edge of the document by the first document sensor 26 to the control of the solenoid 61 in which the state of the stopper 21 is switched from the blocking state to the open state. In particular, the time t1 is set to be enough to correct the skew of the first document, which has a stiffness higher than the second document, as illustrated in FIGS. 4 and 5 indicating the change. The time t1 is experimentally determined.

The time t2 is shorter than the time t1. For example, the time t2 is about 70 to 90% of the time t1. In this configuration, when the document being transported is the second document, the stopper 21 in the blocking state is switched to the open state, or the skew correction control ends, earlier than when the document being transported is the first document. As described above, the controller 50 configured to perform the skew correction control is able to obtain the information about the stiffness of the document and, when the document being transported is the second document having a lower stiffness than the first document, switch the stopper 21 from the blocking state to the open state to end the skew correction control earlier than when the document being transported is the first document. Thus, when the second document having a lower stiffness than the first document is transported, the leading edge of the document is less likely to be crushed when brought in contact with the stopper 21. In the above example, the stiffness of the document is sorted into two types and two types of the skew correction time are set accordingly. However, the present disclosure is not limited to this. The stiffness of the document may be sorted into three or more types and three or more types of the skew correction time may be set accordingly. The first document and the second document having a lower stiffness than the first document are merely used to illustrate the relative stiffness and are not used to limit the types of stiffness of the document to the two types.

In the example illustrated in FIG. 7, the stiffness of the document is determined by using the stiffness sensor 29. However, the operation screen 51 may be used as an information input receiver that receives input of the information about the type of the document. The operation screen 51 may display a UI that accepts input of the information about the type of document. The controller 50 may determine the stiffness of the document based on the information received through the UI. As the UI, a drop-down list that allows the user to select the type of document is displayed together with a message "select the type of document", for example. Examples of the types of documents include "thin paper", "plain paper", and "photo paper". The stiffness of the "photo paper" is the highest, followed in order by the stiffness of the "plain paper" and the stiffness of the "thin paper". The "thin paper" is classified as the second document, and the "plain paper" and the "photo paper" are classified as the first document. In this way, the controller 50 determines the stiffness of the document based on the type of document received by the information input receiver, enabling the controller 50 to have correct information about the stiffness of the document. In another embodiment, an UI that accepts selection of document read modes may be displayed as the above-described UI. The controller 50 may determine the stiffness of document based on the information obtained through the UI. Examples of the document read modes include a "thin paper mode", a "plain paper mode", and a "thick paper mode". The stiffness of document is the highest at the "thin paper mode", followed in order by the "plain paper mode", and the "thick paper mode". The "thin paper mode" is classified as the second document. The "plain paper mode" and the "thick paper mode" are classified as the first document.

As described above, the controller 50 is able to obtain information about the stiffness of the document through the UI. In such a case, the stiffness sensor 29 may be eliminated. Alternatively, the stiffness sensor 29 may be employed in addition to the UI. The user may determine whether or not to display the UI. The UI may be displayed on the external computer 90. The information about the stiffness of document may be inputted through the external computer 90.

In a transportation standby state, the controller 50 may display the UI on the operation screen 51 when the controller 50 determines that a document is placed on the document tray 5 based on the information sent from the presence sensor 28. This eliminates the need for the user to perform an operation for displaying the UI, improving the user friendliness.

The controller 50 may be configured to perform standby control including waiting for a document to be placed on the document tray 5 without a document and rotating the feed roller 10 in a positive direction to send the document from the document tray 5 upon determination that the document is placed on the document tray 5 based on the information sent from the presence sensor 28. In this configuration, when the controller 50 obtains the information about the stiffness of the document in the standby control, the controller 50 may send the document on the document tray 5 without displaying the UI on the operation screen 51. This eliminates the need for the user to input the information about the stiffness of the document at each time the user places a document on the document tray 5, improving the usability of the device. In the standby control, one document is placed at a time on the document tray 5 and sent out, for example. In this control, the UI may be displayed when the first document is placed on the document tray 5, and the display of the UI may be eliminated when the second and subsequent documents are placed on the document tray 5.

Figure 8:
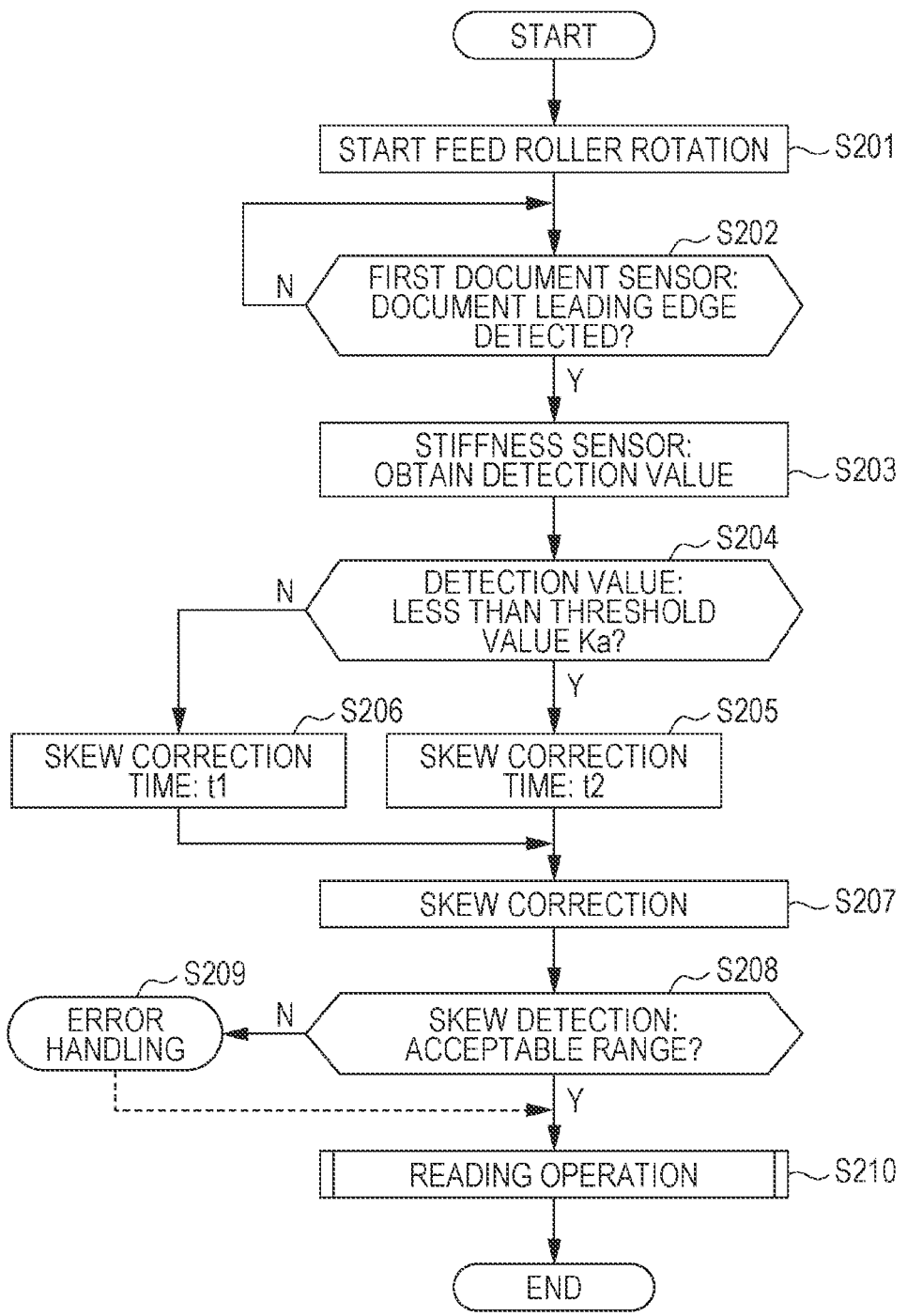
FIG. 8 is a flowchart indicating a skew correction process according to another embodiment.

Next, skew correction control according to another embodiment will be described with reference to FIG. 8. FIG. 8 illustrates an example of control using the skew sensor 31. The steps S201 to S207 in FIG. 8 are the same as the steps S101 to 107 in FIG. 7 and will not be described. In the step S208, it is determined whether the skew of the leading edge of the document is within an acceptable range by using the skew sensor 31 or the degree of the skew is beyond a predetermined range. For example, if the presence of a document is detected by at least the left inner sensor 31B and the right inner sensor 31C at the middle in the X axis direction as illustrated in FIG. 5, the skew of the document is determined to be within the acceptable range. Thus, the distance between the stopper 21 and the skew sensor 31 in the Y axis direction is determined in view of the acceptable degree of the skew. If the document size is small, the left outer sensor 31A and the right outer sensor 31D do not detect the presence of the document regardless of the degree of skew. Thus, the left outer sensor 31A and the right outer sensor 31D are not used to determine whether the skew is within the acceptable range.

The skew is considered to be in the acceptable range if the left inner sensor 31B and the right inner sensor 31C at the middle in the X axis direction detect the presence of the document. Thus, in the example in FIG. 6, it is determined that the document is skewed beyond the predetermined degree. If the document is kept being transported in the example in FIG. 6, the presence of the document having the crushed leading edge may be detected by the left inner sensor 31B and the right inner sensor 31C. However, such a problem is avoided, because the skew correction control time is reduced when the document is the second document having a lower stiffness.

The document may be transported beyond an assumed transportation amount. For example, the document may be further transported in the example in FIG. 6. In such a case, the presence of the document having the crushed leading edge may be detected by the left inner sensor 31B and the right inner sensor 31C and only the right outer sensor 31D does not detect the presence of document. This may lead false determination that the skew of the document is within the acceptable range. Thus, if only one of the left outer sensor 31A and the right outer sensor 31D detects the presence of the document with the presence of the document being detected by the left inner sensor 31B and the right inner sensor 31C at the middle in the X axis direction, the detection is determined to be an error and the step may proceed to the step S209, which will be described later.

Next, when the skew of the document is within the acceptable range (Yes at S208), the process proceeds to a document reading operation (S210). When the skew of the document is beyond the acceptable range (No at S208), the process proceeds to error handling (S209). In this way, when the skew correction of the document is not successful, the process proceeds to the error handling for a positive processing result.

For example, the error handling at the step S209 reduces the rotation speed of the feed roller 10 to continue the skew correction control. Thus, the leading edge of the document is less likely to be crushed when brought in contact with the stopper 21 and the skew correction is likely to be done because the document is turned.

Alternatively, the error handling at the step S209 may include rotating the feed roller 10 backward to send back the document upstream and performing the skew correction control again. In this step, the skew correction control is performed again, and thus the skew correction is likely to be successful.

Alternatively, the error handling at the step S209 may include stopping the feed roller 10 and display, on the operation screen 51, the instruction to set the document again on the document tray 5. The document that was set again on the document tray 5 by the user is likely to be transported with less skew next time. In this example, the skew of the document is detected while the document is being transported and the user is instructed to set the document again on the document tray 5. However, before the document is transported, the skew of the document may be detected and the user may be instructed to set the document again on the document tray 5. In some cases, the leading edge of the document is positioned downstream of the feed roller 10 before the feeding starts.

Figure 9:
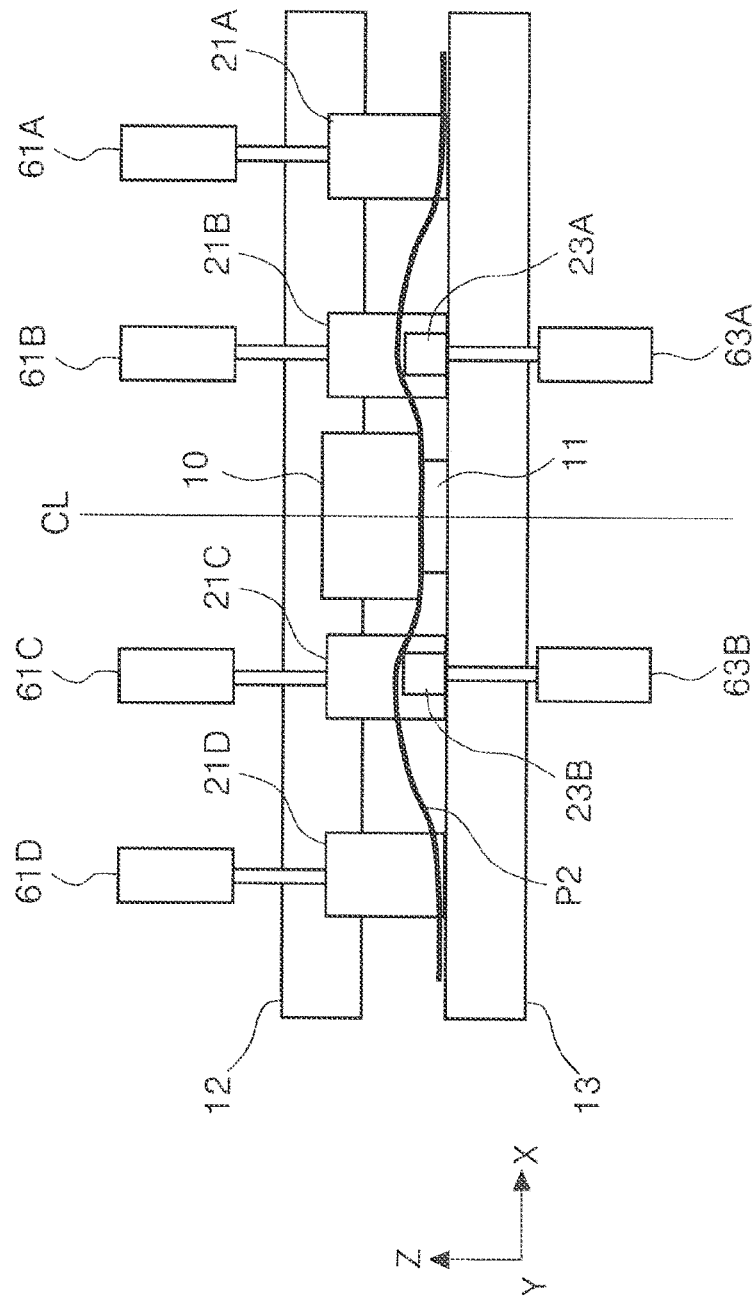
FIG. 9 is a front view indicating a stiffness adding portion in the transportation path.

Next, a configuration that allows a document to more readily turn in the skew correction control will be described with reference to FIGS. 9 to 10. A stiffness adding portion, which will be described with reference to FIGS. 9 and 10, is an optional component of the document transportation device 3. In FIGS. 9 and 10, the reference numeral 23A indicates a first stiffness adding portion and the reference numeral 23B indicates a second stiffness adding portion. Although not illustrated in the drawings, the first and second stiffness adding portions 23A and 23B are located downstream of the feed roller 10 and upstream of the stopper 21 in the transportation path 6 illustrated in FIG. 1.

The first and second stiffness adding portions 23A and 23B are switchable between an advanced state in which the first and second stiffness adding portions 23A and 23B advance in the transportation path 6 as illustrated in FIG. 9 and a retracted state in which the first and second stiffness adding portions 23A and 23B retract away from the transportation path 6 as illustrated in FIG. 10. The state of the first stiffness adding portion 23A is switched by the first solenoid 63A controlled by the controller 50. The state of the second stiffness adding portion 23B is switched by the second solenoid 63B controlled by the controller 50. In this embodiment, although different solenoids are provided for different first and second stiffness adding portions 23A and 23B, one solenoid may be provided to activate both the first and second stiffness adding portions 23A and 23B.

The first and second stiffness adding portions 23A and 23B are positioned in the transportation path 6 depending on the stiffness of the document as illustrated in FIG. 9 at least during the skew correction control. The symbol P2 in FIG. 9 indicates the above-described second document. The second document P2 is corrugated in the X axis direction by a nipping portion, which includes the feed roller 10 and the separation pad 11, and the first and second stiffness adding portions 23A and 23B. This improves the stiffness of the second document P2 in the document transportation direction. The improvement in stiffness of the document in the document transportation direction allows the entire document to readily turn when the leading edge of the document comes in contact with the stopper 21, and thus allows more successful skew correction. When the document is the first document P1, which has a higher stiffness and turns more readily than the second document P2, the first and second stiffness adding portions 23A and 23B are kept being away from the transportation path 6 as illustrated in FIG. 10 during the feeding, reading, and discharging of the document, in addition to the skew correction control. Thus, an excessive transportation load is not applied to the first document P1. In the example illustrated in FIGS. 9 and 10, one stiffness adding portion is disposed on each side of the central position CL in the X axis direction in a symmetrical arrangement, but two or more stiffness adding portions may be disposed on each side.

The present disclosure is not limited to the above-described embodiments. Various modifications may be added to the disclosure without departing from the scope of the disclosure understood from the claims, and the modifications are included in the scope of the disclosure. In the above-described embodiment, the medium transportation device is employed in the scanner 1, which is an example of the image reader. However, the medium transportation device may be employed in a recording apparatus that records on a medium, particularly in an ink jet printer.

What is claimed is:
1. A medium transportation device comprising:
a supply roller configured to send a medium downstream;
at least one stopper that is located downstream of the supply roller in a medium transportation direction in a transportation path along which the medium is transported, the at least one stopper being configured to be switched between a blocking state in which the at least one stopper blocks the transportation path and an open state in which the at least one stopper opens the transportation path; and
a controller that is configured to control rotation of the supply roller and control the switching of the state of the at least stopper, the controller being configured to perform skew correction control in which a leading edge of the medium is brought in contact with the at least one stopper in the blocking state to correct skew of the medium, wherein
the controller is configured to obtain information about a stiffness of the medium and, when a second medium having a lower stiffness than a first medium is transported, the controller switches the at least one stopper from the blocking state to the open state to end the skew correction control earlier than the skew correction control of the first medium.

2. The medium transportation device according to claim 1, wherein the controller determines the stiffness of the medium based on a thickness of the medium.

3. The medium transportation device according to claim 2, further comprising:
a thickness sensor that is configured to determine a thickness of the medium and is located downstream of the supply roller in the medium transportation direction and upstream of the at least one stopper in the medium transportation direction in the transportation path, wherein
the controller determines the stiffness of the medium based on information sent from the thickness sensor.

4. The medium transportation device according to claim 1, further comprising:
an information input receiver that receives input of information about a type of the medium, wherein
the controller determines the stiffness of the medium based on the information about the type of the medium.

5. The medium transportation device according to claim 4, further comprising:
a medium placement portion on which the medium to be sent by the supply roller is placed; and
a presence sensor configured to detect the medium on the medium placement portion, wherein
the information input receiver includes a display configured to display various types of information,
the controller is configured to display, on the display, a user interface that accepts input of the information about the type of the medium, and
the controller displays the user interface on the display upon determination that, in a transportation standby state, the medium is on the medium placement portion based on information sent from the presence sensor.

6. The medium transportation device according to claim 5, wherein the controller is configured to perform standby control including waiting for a medium to be placed on the medium placement portion and rotating the supply roller in a positive direction to send the medium from the medium placement portion upon determination that the medium is placed on the medium placement portion based on the information sent from the presence sensor, and
the controller is configured to send the medium from the medium placement portion without displaying the user interface on the display when the controller obtains information about the stiffness of the medium in the standby control.

7. The medium transportation device according to claim 1, further comprising:
a skew sensor that is located downstream of the supply roller and upstream of the at least one stopper in the medium transportation direction in the transportation path, the skew sensor being configured to detect a skew of the medium, wherein
the controller is configured to perform error handling when the skew of the medium after a predetermined time of the skew correction control is determined to be larger than a predetermined threshold based on information from the skew sensor.

8. The medium transportation device according to claim 7, wherein the error handling includes reducing a rotation speed of the supply roller while continuing the skew correction control.

9. The medium transportation device according to claim 7, wherein the error handling includes rotating the supply roller backward to send back the medium upstream in the medium transportation direction and performing the skew correction control again.

10. The medium transportation device according to claim 7, further comprising:
a display configured to display various types of information; and
a medium placement portion on which a medium to be sent by the supply roller is placed, wherein
the error handling includes stopping the supply roller and displaying, on the display, an instruction to set the medium again on the medium placement portion.

11. The medium transportation device according to claim 1, further comprising:
an information input receiver that receives input of information about a medium read mode, wherein
the controller determines the stiffness of the medium based on the information about the medium read mode.

12. The medium transportation device according to claim 11, further comprising:
a medium placement portion on which a medium to be sent by the supply roller is placed; and
a presence sensor configured to detect presence of a medium on the medium placement portion, wherein
the information input receiver includes a display configured to display various types of information,
the controller is configured to display, on the display, a user interface that receives the input of the information about the medium read mode, and
the controller displays the user interface on the display upon determination that, in a transportation standby state, a medium is on the medium placement portion based on the information sent from the presence sensor.

13. The medium transportation device according to claim 1, further comprising:
a stiffness adding portion that is configured to improve the stiffness of the medium and is located downstream of the supply roller and upstream of the at least one stopper in the medium transportation direction in the transportation path, wherein
the controller is configured to switch the stiffness adding portion between an advanced state in which the stiffness adding portion advances into the transportation path and a retracted state in which the stiffness adding portion retracts from the transportation path and configured to keep the stiffness adding portion in the retracted state when the medium transported is the first medium.

14. An image reader comprising:
the medium transportation device according to claim 1; and
a reading device that is configured to read a surface of the medium transported by the medium transportation device.

15. A medium transportation device comprising:
a supply roller configured to send a medium downstream;
at least one stopper that is located downstream of the supply roller in a medium transportation direction in a transportation path along which the medium is transported, the at least one stopper being configured to be switched between a blocking state in which the at least one stopper blocks the transportation path and an open state in which the at least one stopper opens the transportation path; and
a controller that is configured to control rotation of the supply roller and switch the state of the at least one stopper, the controller being configured to perform skew correction control in which a leading edge of the medium is brought in contact with the at least one stopper in the blocking state to correct skew of the medium, wherein
the controller determines a stiffness of the medium based on information about the stiffness of the medium, and
when a second medium having a lower stiffness than a first medium is transported, the controller switches the at least one stopper from the blocking state to the open state earlier than when the medium is the first medium.

* * * * *